US012658728B2

(12) United States Patent (10) Patent No.: US 12,658,728 B2
Onoyama et al. (45) Date of Patent: Jun. 16, 2026

(54) POWER SYSTEM

(71) Applicant: TOYOTA JIDOSHA KABUSHIKI KAISHA, Toyota (JP)

(72) Inventors: Hiroki Onoyama, Anjo (JP); Kohei Takahashi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 201 days.

(21) Appl. No.: 18/647,360

(22) Filed: Apr. 26, 2024

(65) Prior Publication Data

US 2024/0388112 A1 Nov. 21, 2024

(30) Foreign Application Priority Data

May 15, 2023 (JP) ................................. 2023-080223

(51) Int. Cl.
*H02J 7/90* (2026.01)
*H01M 10/42* (2006.01)
*H02J 7/40* (2026.01)
*H02J 7/44* (2026.01)

(52) U.S. Cl.
CPC ........... *H02J 7/933* (2026.01); *H01M 10/425* (2013.01); *H02J 7/40* (2026.01); *H02J 7/44* (2026.01); *H01M 2010/4278* (2013.01); *H02J 2207/20* (2020.01)

(58) Field of Classification Search
CPC ............... H02J 7/00712; H02J 7/00032; H02J 7/00036; H02J 2207/20; H01M 10/425; H01M 2010/427
See application file for complete search history.

(56) References Cited

U.S. PATENT DOCUMENTS

2017/0291499 A1* 10/2017 Shin ...................... H02J 7/0029

FOREIGN PATENT DOCUMENTS

JP 2012-106581 A 6/2012
JP 2021-072712 A 5/2021

* cited by examiner

*Primary Examiner* — Gary L Laxton
(74) *Attorney, Agent, or Firm* — Finnegan, Henderson, Farabow, Garrett and Dunner LLP

(57) ABSTRACT

A power system includes a battery device that outputs information related to a battery, a power generation device that supplies power to the battery device, and a control device that controls power generation voltage of the power generation device based on the information acquired from the battery device. The control device controls, when the information is not acquirable from the battery device, power generation voltage of the power generation device based on the output voltage that is voltage on an output end side of the power generator.

4 Claims, 5 Drawing Sheets

POWER SYSTEM

CROSS-REFERENCE TO RELATED APPLICATION

This application claims priority to Japanese Patent Application No. 2023-080223 filed on May 15, 2023, incorporated herein by reference in its entirety.

BACKGROUND

1. Technical Field

The present disclosure relates to a power system that controls a battery.

2. Description of Related Art

Japanese Unexamined Patent Application Publication No. 2021-072712 (JP 2021-072712 A) discloses an electrified vehicle that does not impede an opportunity for the vehicle to travel while safety of the vehicle is ensured. The electrified vehicle described in JP 2021-072712 A describes not executing safety control that restricts traveling control of the vehicle, when a communication abnormality detection unit detects communication abnormality related to a charging unit while the vehicle is traveling, is described.

SUMMARY

When the detected communication abnormality is related to the battery, it is conceivable to electrically disconnect the battery in which the communication abnormality has been detected from a system for safety. However, in a case where the battery is a battery necessary for implementing the safety control, there is an issue that necessary control in a situation where the safety control is requested cannot be performed, when the battery is disconnected from the system.

The present disclosure has been made in a view of the issue mentioned above, and an object of the present disclosure is to provide a power system in which the battery can be used safely and continuously without immediately disconnecting the battery from the system, even when information related to the battery is not directly acquirable from the battery due to the communication abnormality and the like.

In order to solve the above issue, an aspect of the disclosed technology is a power system that includes a battery device that outputs information related to a battery, a power generation device that supplies power to the battery device, and a control device that controls power generation voltage of the power generation device based on the information acquired from the battery device. The control device controls, when the information is not acquirable from the battery device, power generation voltage of the power generation device based on the output voltage that is voltage on an output end side of the power generator.

In the power system according to the present disclosure described above, even when the information related to the battery is not directly acquirable from the battery due to communication abnormality and the like, it is possible to use the battery safely and continuously without immediately disconnecting the battery from the system.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

A power system of the present disclosure controls, when an electronic control unit (ECU) that controls a direct current direct current (DCDC) converter cannot acquire feedback information on output voltage requested from a battery side to the DCDC converter, the output voltage of the DCDC converter in order for the battery to be used safely and continuously based on the actual output voltage of the DCDC converter.

Hereinafter, an embodiment of the present disclosure will be described in detail with reference to the drawings.

EMBODIMENT

Configuration

Figure 1:
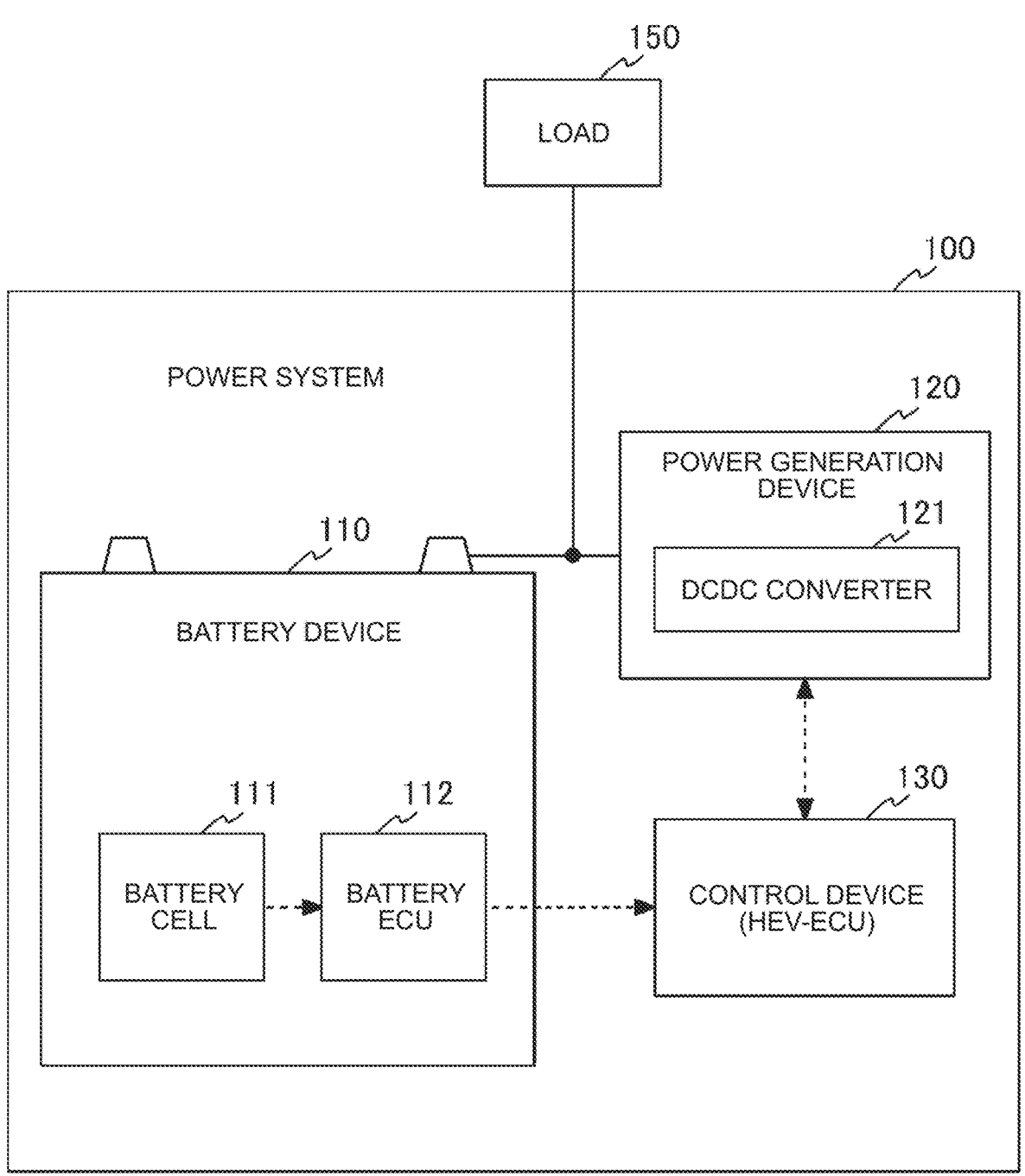
FIG. 1 is a schematic configuration diagram of a power system according to an embodiment of the present disclosure.

FIG. 1 is a diagram showing a schematic configuration of a power system 100 according to an embodiment of the present disclosure. The power system 100 shown in FIG. 1 includes a battery device 110, a power generation device 120, and a control device 130. In FIG. 1, a power line through which power is supplied is shown by a continuous line, and a signal line through which a control instruction, data, and the like are communicated is shown by a dashed line. The power system 100 may be mounted on a vehicle and the like.

The battery device 110 is a chargeable/dischargeable secondary battery such as a lithium-ion battery. The battery device 110 can store power generated by the power generation device 120 and can supply the power stored in the battery device 110 to a load 150. The battery device 110 is configured to include a battery cell 111 and a battery ECU 112 that monitors a state of the battery cell 111. Specifically, the battery ECU 112 acquires information related to the battery cell 111, thereby providing the acquired information and the like to the control device 130. Information related to the battery cell 111 is a physical quantity such as voltage and current indicating the state of the battery cell 111. The battery ECU 112 acquires the physical quantity via a detection device (not shown) such as a sensor. Furthermore, the battery ECU 112 calculates a value of power generation voltage to be requested to the power generation device 120, as information necessary for protecting the battery cell 111. These pieces of information are transmitted from the battery ECU 112 to the control device 130. An example of the battery device 110 is an auxiliary battery mounted on the vehicle.

The power generation device 120 is a device for supplying power to the battery device 110 and the load 150. The power generation device 120 is typically a DCDC converter 121 (a power converter) that converts the voltage of input power into predetermined voltage and outputs the predetermined voltage. For example, power generated by a generator (not shown) such as an alternator is input to an input end of the DCDC converter 121. The DCDC converter 121 can be, for example, a step-down DCDC converter that steps down the voltage on the input end side and that outputs the voltage on an output end side to which the battery device 110 and the load 150 are connected. Note that a configuration of the power generation device 120 may include both the DCDC converter 121 and the generator.

The control device 130 is a device for controlling output of the power generation device 120 for safe use of the battery device 110. The control device 130 acquires information related to the battery device 110 (hereinafter referred to as "battery information") from the battery device 110 (the battery ECU 112 thereof), and controls the power generation voltage of the power generation device 120 based on the battery information. The battery information includes information related to the battery cell 111 and information on the requested power generation voltage for the power generation device 120. For example, in a case of a vehicle, the control device 130 acquires the battery information from the battery device 110 through communication by using a network such as a controller area network (CAN) and a local interconnect network (LIN). Further, the control device 130 acquires the output voltage that is voltage on the output end side of the DCDC converter 121 that constitutes the power generation device 120, and the control device 130 can control the power generation voltage of the power generation device 120 based on the output voltage. The control device 130 can acquire the output voltage of the DCDC converter 121 via the detection device (not shown) such as a voltage sensor. Details of the control of the power generation device 120 by the control device 130 will be described later.

Part or all of the control device 130 may be configured by an ECU (for example, a hybrid electric vehicle (HEV)-ECU, and a battery master ECU) that typically includes a processor such as a microcomputer, a memory, an input/output interface, and the like. In the ECU, some or all of the functions performed by the control device 130 described above can be realized when the processor reads and executes a program stored in the memory.

The load 150 is an equipment, a device, a system, and the like that operates by consuming the power output from the power generation device 120 and/or the power stored in the battery device 110. When the battery device 110 is the auxiliary battery mounted on the vehicle, the load 150 is, for example, an auxiliary device (a lighting device, an air conditioning device, and the like) that is not related to traveling of the vehicle.

Control

Figure 2A:
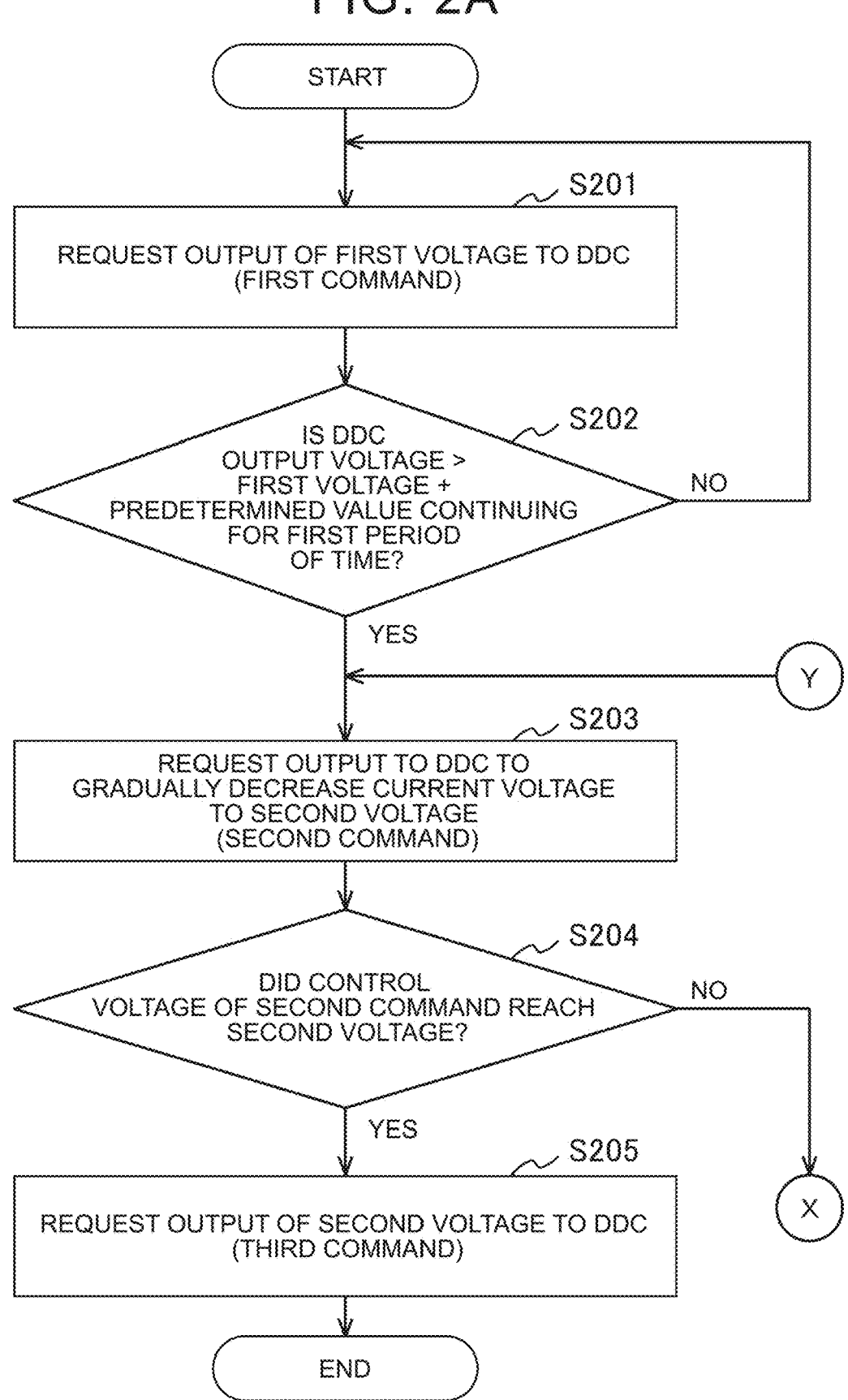
FIG. 2A is a flowchart of voltage control processing performed by a control device of the power system.
Figure 2B:
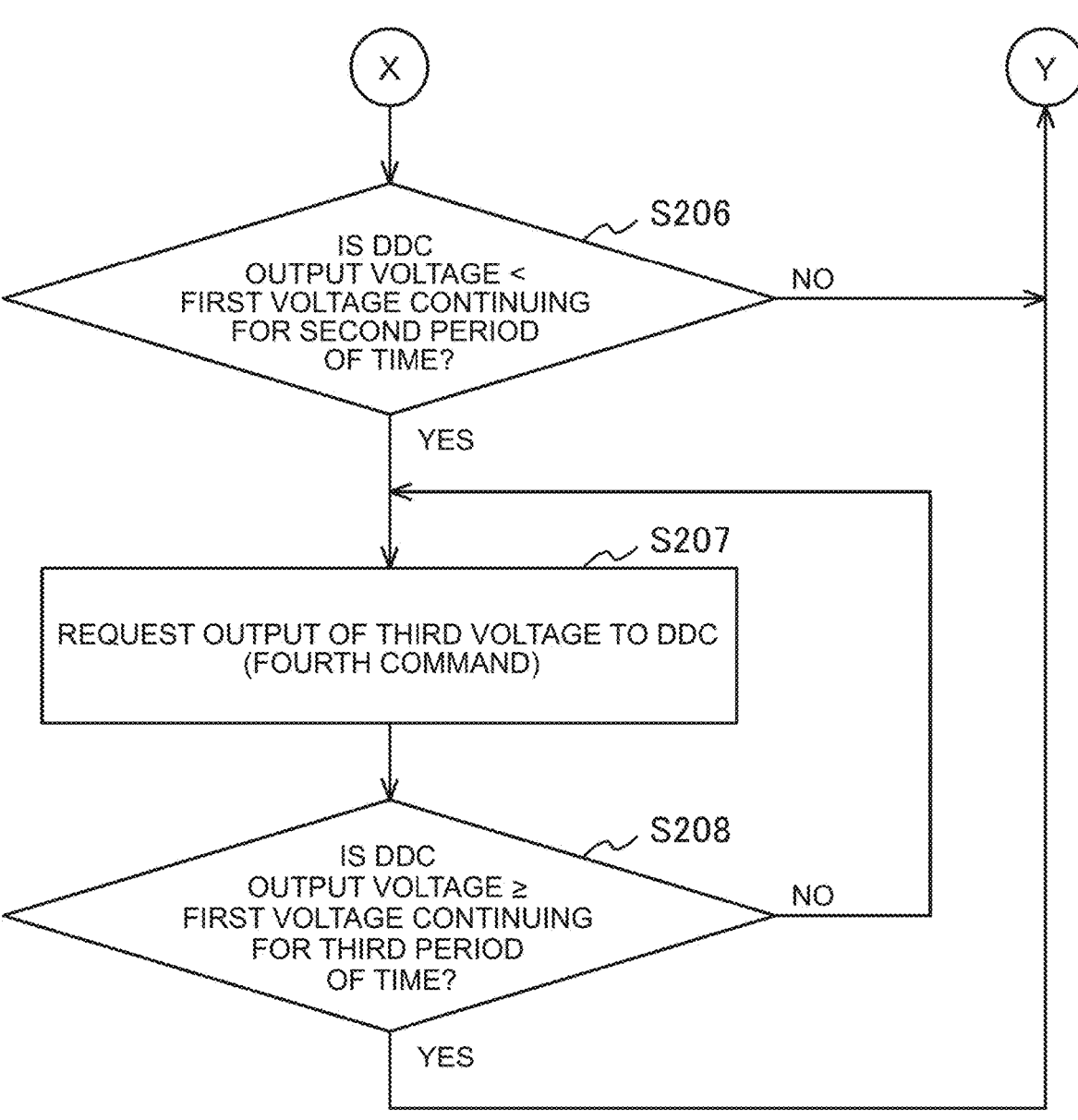
FIG. 2B is a flowchart of the voltage control processing performed by the control device of the power system.

Next, with further reference to FIGS. 2A, 2B, 3, 4, 5, and 6, control performed by the power system 100 according to the present embodiment will be described. FIGS. 2A and 2B are flowcharts illustrating procedures of voltage control processing for the power generation device 120 performed by the control device 130 of the power system 100. The processing of FIG. 2A and the processing of FIG. 2B are connected by connectors X and Y. FIGS. 3, 4, 5, and 6 are diagrams each illustrating a change in the output voltage of the power generation device 120 at each processing stage of the voltage control processing.

The voltage control processing illustrated in FIGS. 2A and 2B starts, for example, when the control device 130 cannot acquire the battery information from the battery device 110 due to communication abnormality and the like, or when reliability of the battery information acquired from the battery device 110 cannot be guaranteed due to abnormality and the like in the detection device. Note that, in the following description, a control target of the power generation device 120 is described as the DCDC converter 121.

Step S201

The control device 130 requests the DCDC converter (DDC) 121 so that the output voltage (the voltage on the output end side) of the DCDC converter 121 becomes first voltage. The request and each request described below are typically performed by instructing (controlling) a value of ON/OFF duty ratio of a switching element that constitutes the DCDC converter 121. An instruction (control) requesting the DCDC converter 121 to output the first voltage is referred to as a "first command". The first voltage is target voltage at which it is estimated that the battery device 110 can be used safely, and is appropriately set based on performance and a characteristic of the battery device 110.

When the first command is given to the DCDC converter 121 by the control device 130, the processing proceeds to step S202.

Step S202

After the control device 130 gives the first command to the DCDC converter (DDC) 121, the control device 130 determines whether a state where the output voltage of the DCDC converter 121 does not decrease to the first voltage but becomes a value higher than the first voltage by a predetermined value (the state satisfying a condition of "the DDC output voltage>the first voltage+the predetermined value") continues for a first period of time. The determination is made to confirm that the abnormality in which the output voltage does not decrease with only the first command has occurred in the battery device 110. The predetermined value is an offset value from the first voltage for defining upper limit voltage that is allowed to ensure safety of the battery device 110. The first period of time is time for confirming that a situation where the output voltage of the DCDC converter 121 exceeds the upper limit voltage (=the first voltage+the predetermined value) is not temporary and is continuing. The predetermined value and the first period of time are appropriately set based on the performance and the characteristic of the battery device 110 and the like, in a viewpoint of ensuring the safety of the battery device 110.

When the control device 130 determines that the output voltage of the DCDC converter (DDC) 121 exceeds the first voltage by the predetermined value (the DDC output voltage>the first voltage+the predetermined value) continuously for the first period of time (step S202; Yes), the processing proceeds to step S203 as continuing the first command is not appropriate.

Figure 3:
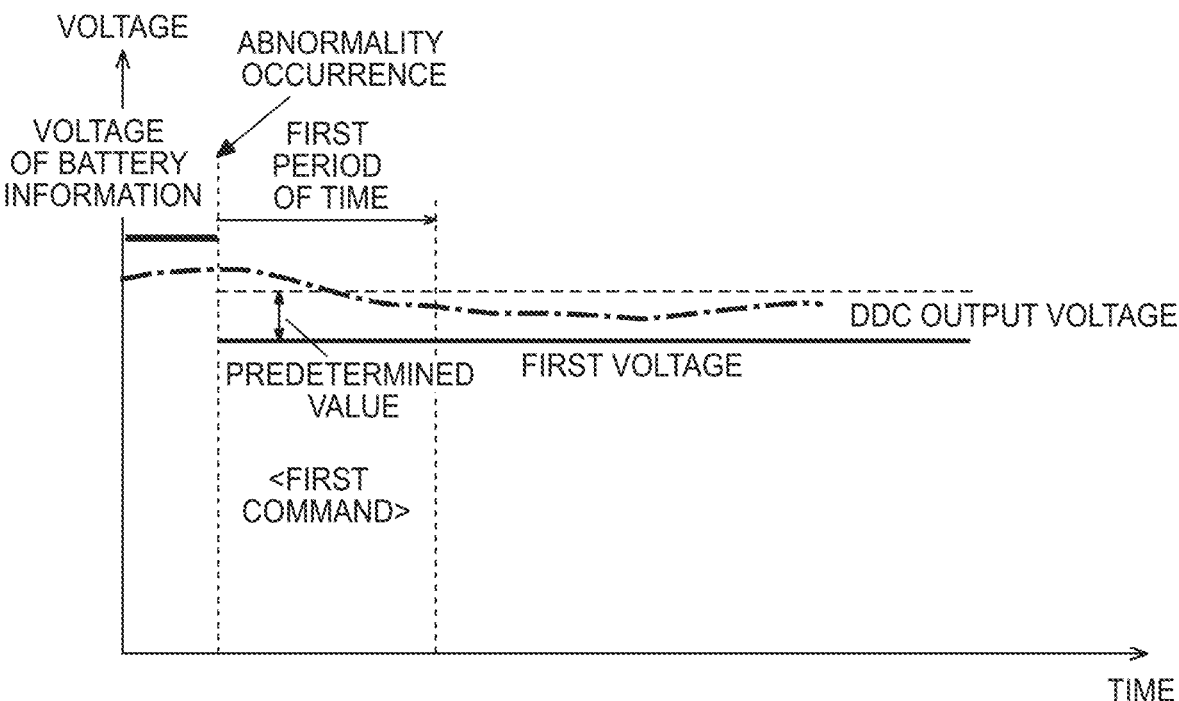
FIG. 3 is a diagram explaining a change in output voltage of a power generation device in the voltage control processing (first command)

In contrast, when the control device 130 determines that the output voltage of the DCDC converter (DDC) 121 does not exceed the first voltage by the predetermined value (the DDC output voltage≤the first voltage+the predetermined value) continuously for the first period of time (step S202; No), the processing proceeds to step S201 as continuing the first command is appropriate. FIG. 3 is a diagram showing the change in the output voltage of the DCDC converter 121 in this case. As shown in FIG. 3, when the output voltage of the DCDC converter 121 (a long dashed short dashed line) does not exceed the first voltage (a continuous line) by the predetermined value (a two direction arrow), or when the output voltage of the DCDC converter 121 exceeds the first voltage by the predetermined value does not continue for the first period of time, the control of the output voltage of the DCDC converter 121 by the first command continues.

Step S203

The control device 130 requests the DCDC converter 121 so that the output voltage of the DCDC converter (DDC) 121 becomes second voltage by gradually decreasing from the current voltage. An instruction (control) requesting the DCDC converter 121 to eventually output the second voltage by gradually decreasing the current voltage is referred to as a "second command". The second voltage is voltage lower than the first voltage, is minimum lower limit voltage required for guaranteeing the safety of the battery device 110 and for operating the load 150, and is appropriately set based on the performance and the characteristic of the battery device 110, specification of the load 150, and the like. The current voltage to the second voltage may be changed according to a predetermined linear straight line, a predetermined quadratic curve, and the like.

When the second command is given to the DCDC converter 121 by the control device 130, the processing proceeds to step S204.

Step S204

After the control device 130 gives the second command to the DCDC converter (DDC) 121, the control device 130 determines whether a control value (control voltage) of the second command has reached the second voltage. The determination is made in order to define that the output voltage of the DCDC converter 121 will not stabilize below the first voltage even when the control by the second command is performed.

When the control device 130 determines that the control value (the control voltage) of the second command has reached the second voltage (step S204; Yes), the processing proceeds to step S205 as proceeding the control to a final stage is appropriate.

In contrast, when the control device 130 determines that the control value (the control voltage) of the second command has not yet reached the second voltage (step S204; No), the processing proceeds to step S206 to further determine whether to advance the second command to the next step.

Step S205

Figure 4:
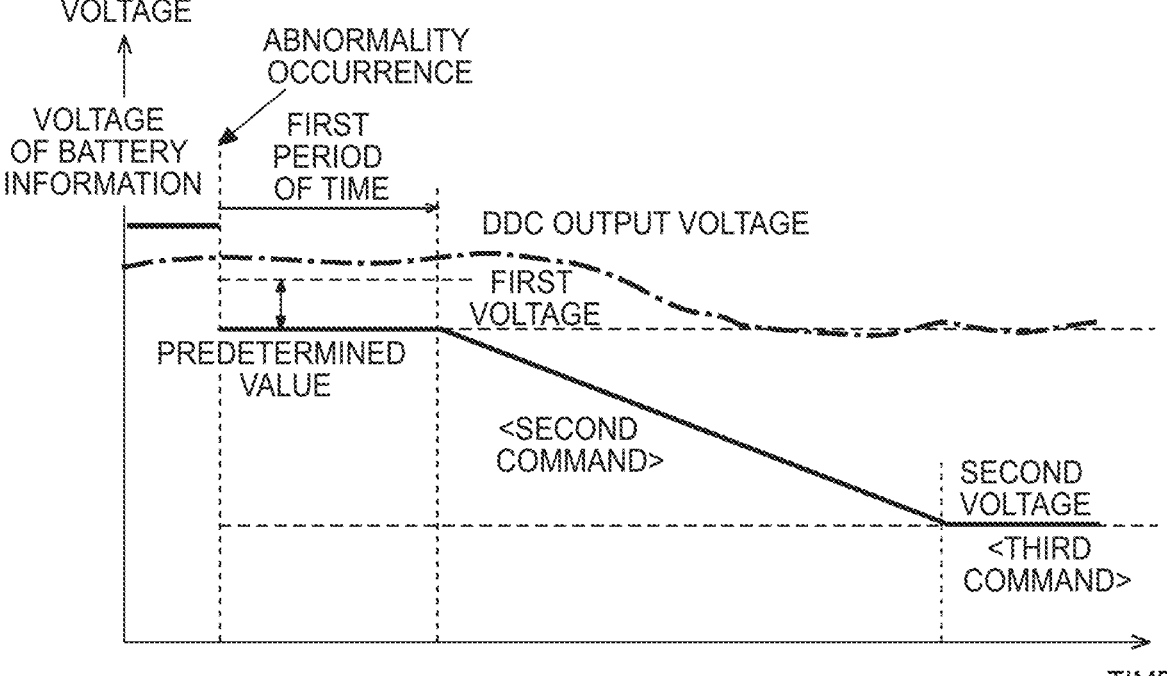
FIG. 4 is a diagram explaining a change in the output voltage of the power generation device in the voltage control processing (second command to third command)

The control device 130 requests the DCDC converter 121 so that the output voltage of the DCDC converter (DDC) 121 becomes the second voltage. An instruction (control) requesting the DCDC converter 121 to output the second voltage is referred to as a "third command". The third command is final control that can be taken to minimize influence of the battery device 110 on another device and the like. FIG. 4 is a diagram showing the change in the output voltage of the DCDC converter 121 in this case. As shown in FIG. 4, when the output voltage of the DCDC converter 121 (the long dashed short dashed line) does not fall below the first voltage (an upper end of the continuous line) for a certain period of time, the control of the output voltage of the DCDC converter 121 is fixed to the third command from when the control value of the second command reaches the second voltage (a lower end of the continuous line).

When the third command is given to the DCDC converter 121 by the control device 130, the voltage control processing of the power generation device 120 ends.

Step S206

After the control device 130 gives the second command to the DCDC converter (DDC) 121, the control device 130 determines whether a state where the output voltage of the DCDC converter 121 is lower than the first voltage (the state satisfying a condition of "the DDC output voltage<the first voltage") continues for a second period of time. The determination is made to confirm that the output voltage of the DCDC converter 121 has been reduced to a desired level by performing the second command. The second period of time is time for confirming that a situation where the output voltage of the DCDC converter 121 is lower than the first voltage is not temporary and is continuing. Therefore, the second period of time is appropriately set based on the performance and the characteristic of the battery device 110 and the like, in the viewpoint of ensuring the safety of the battery device 110.

When the control device 130 determines that the output voltage of the DCDC converter (DDC) 121 is lower than the first voltage (the DDC output voltage<the first voltage) continuously for the second period of time (step S206; Yes), the processing proceeds to step S207 as advancing the second command to the next step is appropriate.

In contrast, when the control device 130 determines that the output voltage of the DCDC converter (DDC) 121 does not become lower than the first voltage (the DDC output voltage>the first voltage) continuously for the second period of time (step S206; No), the processing proceeds to step S203 as continuing the second command is appropriate.

Step S207

Figure 5:
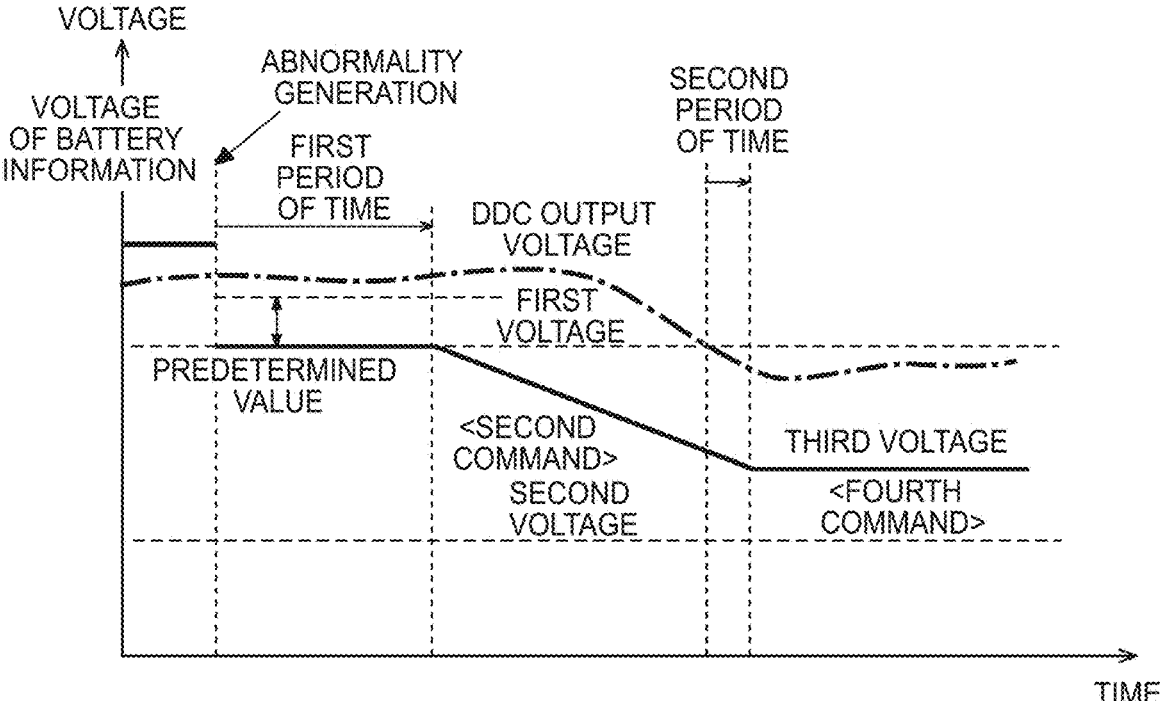
FIG. 5 is a diagram explaining a change in the output voltage of the power generation device in the voltage control processing (second command to fourth command)

The control device 130 requests the DCDC converter 121 so that the output voltage of the DCDC converter (DDC) 121 becomes third voltage. An instruction (control) requesting the DCDC converter 121 to output the third voltage is referred to as a "fourth command". The fourth command is control for maintaining a voltage state at the time when the output voltage of the DCDC converter 121 has been determined to have decreased to the desired level by performing the second command. Therefore, the third voltage becomes the control value (the control voltage) of the second command at the time when, in step S206, the control device 130 determines that the output voltage of the DCDC converter 121 is lower than the first voltage (the DDC output voltage<the first voltage) continuously for the second period of time. FIG. 5 is a diagram showing the change in the output voltage of the DCDC converter 121 in this case. As shown in FIG. 5, when the output voltage of the DCDC converter 121 (the long dashed short dashed line) becomes lower than the first voltage continuously for the second period of time, the gradual decrease of the control voltage is stopped and the control of the output voltage of the DCDC converter 121 by the fourth command is performed by fixing the control voltage to the third voltage (the lower end of the continuous line) at the time of stopping the gradual decrease.

When the fourth command is given to the DCDC converter 121 by the control device 130, the processing proceeds to step S208.

Step S208

After the control device 130 gives the fourth command to the DCDC converter (DDC) 121, the control device 130 determines whether a state where the output voltage of the DCDC converter 121 is equal to or higher than the first voltage (the state satisfying a condition of "the DDC output voltage≥the first voltage") continues for a third period of time. The determination is made to confirm whether the output voltage of the DCDC converter 121 has returned to a value equal to or higher than the first voltage again after switching from the second command to the fourth command. The third period of time is time for confirming that a situation where the output voltage of the DCDC converter 121 has returned to a value equal to or higher than the first voltage is not temporary and is continuing. Therefore, the third period of time is appropriately set based on the performance and the characteristic of the battery device 110 and the like, in the viewpoint of ensuring the safety of the battery device 110.

Figure 6:
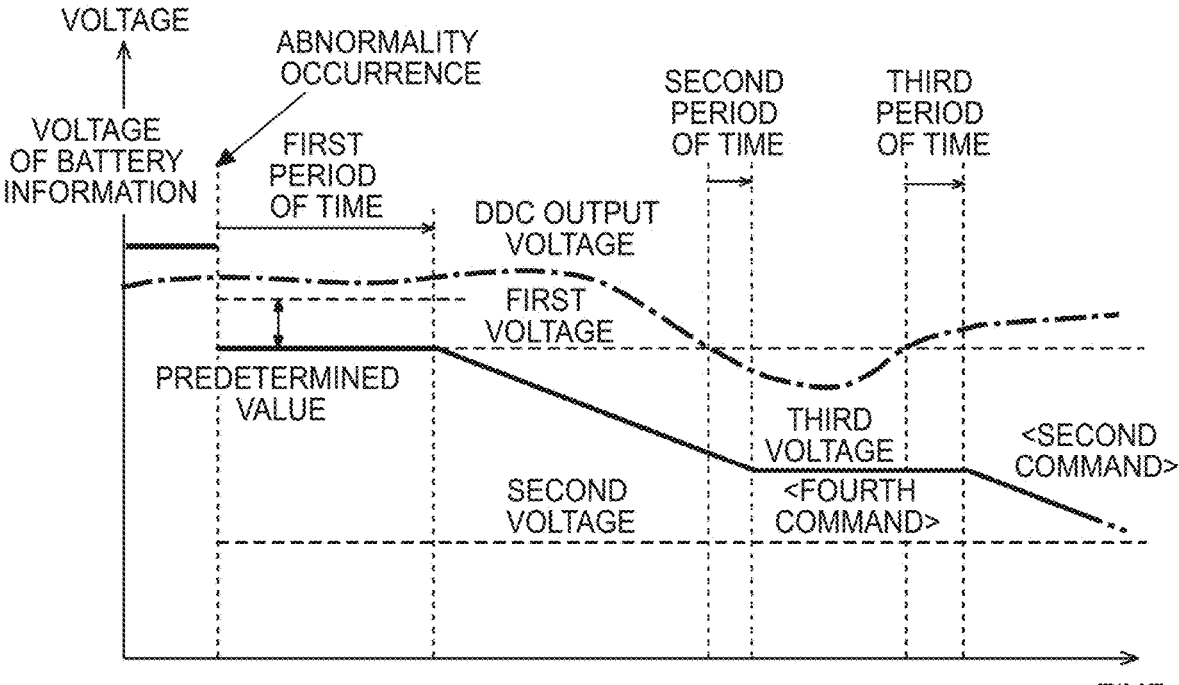
FIG. 6 is a diagram explaining a change in the output voltage of the power generation device in the voltage control processing (fourth command to second command).

When the control device 130 determines that the output voltage of the DCDC converter (DDC) 121 is equal to or higher than the first voltage (the DDC output voltage≥the first voltage) continuously for the third period of time (step S208; Yes), the processing proceeds to step S203 as returning the fourth command to the second command is appropriate. FIG. 6 is a diagram showing the change in the output voltage of the DCDC converter 121 in this case. As shown in FIG. 6, when, in the fourth command, the output voltage of the DCDC converter 121 (the long dashed short dashed line) is equal to or higher than the first voltage continuously for the third period of time, the fixation of the third voltage of the control voltage is cancelled and the control of the output voltage of the DCDC converter 121 by the second command that gradually decreases the control value (the control voltage) to the second voltage is performed again.

In contrast, when the control device 130 determines that the output voltage of the DCDC converter (DDC) 121 does not become equal to or higher than the first voltage (the DDC output voltage<the first voltage) continuously for the third period of time (step S208; No), the processing proceeds to step S207 as continuing the fourth command is appropriate.

The voltage control processing of the power generation device 120 described above ends at the time when the control of the output voltage of the DCDC converter 121 by the third command is performed (step S205) or when the abnormality in the battery device 110 (the communication abnormality, the abnormality in the detection device, and the like) is resolved.

Operations and Effects

As described above, in the power system 100 according to an embodiment of the present disclosure, when the request related to the output voltage of the DCDC converter 121 that constitutes the power generation device 120 cannot be directly acquired from the battery device 110, the control device 130 controls the output voltage of the DCDC converter 121 based on the actual output voltage of the DCDC converter 121 so that the battery device 110 can be used safely and continuously.

Through this processing, even when the battery information is not directly acquirable from the battery device 110 due to the communication abnormality and the like, it is possible to use the battery device 110 safely and continuously without immediately disconnecting the battery device 110 from the power system 100.

Although the embodiment of the present disclosure has been described above, the present disclosure can be applied not only to the power system but also a method executed by the power system including the processor and the memory and the like, a program for executing the method, a computer-readable non-transitory storage medium that stores the program, a vehicle equipped with the power system, and the like.

The power system of the present disclosure can be used when controlling the output of the battery mounted on the vehicle by using the DCDC converter and the like.

What is claimed is:

1. A power system, comprising:
a battery device that outputs information related to a battery;
a power generation device that supplies power to the battery device; and
a control device that controls power generation voltage of the power generation device based on the information acquired from the battery device,
wherein the control device controls, when the information is not acquirable from the battery device, the power generation voltage of the power generation device based on output voltage that is voltage on an output end side of the power generation device,
wherein the power generation device is a DCDC converter that outputs input power to the battery device,
wherein the control device gives, when the information is not acquirable from the battery device, a first command that controls the output voltage of the DCDC converter to a first voltage to the DCDC converter, and
wherein when the output voltage of the power generation device continues to be higher than the first voltage by a predetermined value or more for a first period of time after the control device gives the first command to the DCDC converter, the control device gives a second command to the DCDC converter to gradually decrease control voltage to second voltage lower than the first voltage.

2. The power system according to claim 1, wherein when control voltage of the second command reaches the second voltage after the control device gives the second command to the DCDC converter, the control device gives a third command to the DCDC converter to control the output voltage of the DCDC converter to the second voltage.

3. The power system according to claim 1, wherein when a state where the output voltage of the power generation device becomes lower than the first voltage continues for a second period of time after the control device gives the second command to the DCDC converter, the control device gives a fourth command to the DCDC converter to control the output voltage of the DCDC converter to third voltage that is a command value at the time the state has continued for the second period of time.

4. The power system according to claim 3, wherein when a state where the output voltage of the power generation device continues to be equal to or higher than the first voltage for a third period of time after the control device gives the fourth command to the DCDC converter, the control device gives the second command to the DCDC converter.

* * * * *